United States Patent
Bardin et al.

(10) Patent No.: US 10,415,449 B2
(45) Date of Patent: Sep. 17, 2019

(54) UREA DEPOLLUTION CIRCUIT COMPRISING A DOUBLE-SEAT VALVE SELECTIVELY ENSURING THE DEGASSING OR THE RECIRCULATION OF THE AQUEOUS UREA SOLUTION

(71) Applicant: AKWEL SA, Champfromier (FR)

(72) Inventors: Matthieu Bardin, Chatuzange le Goubet (FR); Christophe Bondran, Saint Uze (FR); Sylvain Jaquet, Chatuzange le Goubet (FR); Yves Lamirand, Bourg de Péage (FR)

(73) Assignee: AKWEL SA, Champfromier (FR)

( * ) Notice: Subject to any disclaimer, the term of this patent is extended or adjusted under 35 U.S.C. 154(b) by 143 days.

(21) Appl. No.: 15/631,518

(22) Filed: Jun. 23, 2017

(65) Prior Publication Data
US 2017/0370260 A1     Dec. 28, 2017

(30) Foreign Application Priority Data

Jun. 23, 2016  (FR) ..................................... 16 55867

(51) Int. Cl.
*F01N 3/20* (2006.01)
*B01D 53/92* (2006.01)
(Continued)

(52) U.S. Cl.
CPC ............. *F01N 3/206* (2013.01); *B01D 53/92* (2013.01); *F01N 3/2066* (2013.01);
(Continued)

(58) Field of Classification Search
CPC ....... B01D 53/92; F01N 3/206; F01N 3/2066; F01N 3/2896; F01N 2260/06;
(Continued)

(56) References Cited

U.S. PATENT DOCUMENTS

| 2,443,816 A | * | 6/1948 | Davis, Jr. | ............ F16K 31/1266 137/583 |
| 2008/0148716 A1 | | 6/2008 | Nishibu et al. | |
| 2011/0113765 A1 | * | 5/2011 | Bruck | ................... F01N 3/2066 60/303 |

FOREIGN PATENT DOCUMENTS

| DE | 19819579 C1 | 9/1999 |
| DE | 102012213525 A1 | 2/2014 |

(Continued)

*Primary Examiner* — Brandon D Lee
(74) *Attorney, Agent, or Firm* — Oliff PLC (57) ABSTRACT

The invention concerns a circuit intended to transfer, by means of a pump, first fluid, such as an aqueous urea solution, from a reservoir to an injector, said circuit also containing a second fluid, such as air, and said circuit comprising, downstream of the pump and of the reservoir, a downstream circuit portion which includes, on the one hand, a main branch which leads to the injector and, on the other hand, bypass branch which returns to the reservoir and which is provided with a double-seat valve designed to selectively and automatically adopt: purge configuration allowing to purge the second fluid through the valve out of the main branch, a pressurized supply configuration allowing to direct the first fluid to the injector under a predetermined working pressure, and a recirculation configuration allowing a recirculation through the bypass branch, and to the reservoir, of the first fluid coming from said reservoir.

16 Claims, 3 Drawing Sheets

(51) Int. Cl.
*F01N 3/28* (2006.01)
*F16K 1/14* (2006.01)
*F16K 1/44* (2006.01)
*F16K 7/12* (2006.01)

(52) U.S. Cl.
CPC .............. *F01N 3/2896* (2013.01); *F16K 1/14* (2013.01); *F16K 1/446* (2013.01); *F16K 7/12* (2013.01); *F01N 2260/06* (2013.01); *F01N 2260/14* (2013.01); *F01N 2570/14* (2013.01); *F01N 2610/02* (2013.01); *F01N 2610/14* (2013.01); *F01N 2610/1473* (2013.01); *Y02A 50/2325* (2018.01); *Y02T 10/24* (2013.01)

(58) Field of Classification Search
CPC ............. F01N 2260/14; F01N 2570/14; F01N 2610/02; F01N 2610/14; F01N 2610/1473; F16K 1/14; F16K 1/446; F16K 7/12; Y02A 50/2325; Y02T 10/24
See application file for complete search history.

(56) References Cited

FOREIGN PATENT DOCUMENTS

| | | | | |
|---|---|---|---|---|
| GB | 1158311 A | * | 7/1969 | ......... F16K 31/0679 |
| GB | 1158311 A | | 7/1969 | |
| WO | 2012/031536 A1 | | 3/2012 | |

\* cited by examiner

UREA DEPOLLUTION CIRCUIT COMPRISING A DOUBLE-SEAT VALVE SELECTIVELY ENSURING THE DEGASSING OR THE RECIRCULATION OF THE AQUEOUS UREA SOLUTION

The present invention concerns the fluid transfer circuits, and more particularly the circuits intended to inject a fluid containing a reducing agent, such as urea, into exhaust gases of a combustion engine, for depollution purposes.

Urea depollution circuits are already known, which comprise a reservoir containing an aqueous urea solution (generally designated by the trade name AdBlue®), a pump drawing the urea solution from the reservoir, and a circuit which connects the pump to an injector arranged to deliver the pressurized urea solution into the exhaust line of the vehicle.

The implementation of such urea depollution circuits may however encounter several difficulties.

First of all, the presence of air in the circuit, in particular after a period of inactivity of the pump, may disturb the re-priming of said pump as well as, more generally, the proper operation of the circuit.

In this regard, it will be noted that it is difficult to consider purging effectively the air from the circuit by discharging said air through the injector, because, by doing so, there would be the risk of seeing the urea solution flowing at low pressure in the exhaust line through the injector, without said urea solution being suitably sprayed, which might lead to the formation of urea crystals which would obstruct said exhaust line.

Furthermore, it is also not possible to permanently leave the pump filled with urea solution, in particular when the vehicle is stopped at severe cold, because the aqueous urea solution is sensitive to frost, such that a permanent filling would expose the pump, and more generally the circuit, to a risk of damage, or even bursting.

It is to limit such risks that the known urea depollution circuits generally have relatively complex structures, such as the one described in document WO-2014/005750 which includes a plurality of anti-freeze expansion tanks as well as at least two pumps which are each associated to a single operating direction and which are each provided for this purpose with at least two check valves, so as to be able to efficiently organize the management of the different fluids in the different operating phases, namely priming the first pump with air purge through the second pump, injecting the pressurized urea solution by the first pump, then resting the circuit together with performing a draining by the second pump.

Of course, the complexity of such circuits tends to make said circuits relatively heavy, bulky, and expensive, while increasing the probability of an occurrence of a failure.

The objects assigned to the invention therefore aim to propose a new fluid transfer circuit, and more particularly a new urea depollution circuit, which is simpler, more compact, more robust, more reliable and less expensive to manufacture than the known circuits, while keeping, or even improving, the different useful functions and the efficiency of the known circuits.

The objects assigned to the invention are achieved by means of a circuit intended to transfer, by means of a pump, a first fluid, such as an aqueous urea solution, from a reservoir to a destination point, such as an injector, said circuit being likely to contain, in addition to the first fluid, a second fluid, such as air, whose density and dynamic viscosity are lower than those of the first fluid, said circuit comprising, downstream of the pump and the reservoir, a downstream circuit portion which includes, on the one hand, a first branch, called main branch, which leads to the destination point and, on the other hand, a second branch, called bypass branch, which bifurcates from the first branch, at a bifurcation located upstream of the destination point, in order to return to the reservoir, said circuit being characterized in that the bypass branch is provided with a double-seat valve which comprises a shutter which is movably mounted between a first seat connected to the main branch and a second seat connected to the reservoir, said double-seat valve being arranged to adjust the position of the shutter depending on the drag exerted by the fluid which penetrates into said valve, so as to be able to selectively and automatically adopt:

a first configuration, called « purge configuration », in which the shutter adopts, under the action of the second fluid, an intermediate position between the first seat and the second seat, thus placing the valve in an open configuration, so as to allow a purge of said second fluid out of the main branch and a return of said second fluid to the reservoir by the bypass branch, a second configuration, called « pressurized supply configuration », in which the shutter is positioned into sealing contact with the second seat, under the action of the first fluid, when said first fluid is driven by the pump according to an operating regime called « pressurized supply regime », so as to direct the first fluid towards the destination point, through the main branch, under a pressure equal to or higher than a predetermined pressure threshold called « working pressure threshold », and a third configuration, called « recirculation configuration », in which the shutter adopts, under the action of the first fluid, an intermediate position between the first seat and the second seat, thus placing the valve in an open configuration, when said first fluid is driven by the pump according to an operating regime called « recirculation regime », distinct from the pressurized supply regime and giving said first fluid a head lower than said pressurized supply regime, so as to allow an at least partial recirculation through the bypass branch, and to the reservoir, of said first fluid from said reservoir.

Furthermore, the valve may also preferably adopt selectively a fourth configuration, called « vacuum configuration », in which the shutter comes into sealing contact with the first seat, when the pump adopts a regime called « vacuum regime », according to which said pump returns the first fluid contained in the main branch to the reservoir, so as to place the valve in a closed configuration in order to prevent the aspiration of the first fluid and/or second fluid through the bypass branch.

Advantageously, the circuit according to the invention therefore proposes a simplified architecture, within which a double-seat valve, which constitutes a passive component (in this regard, in particular devoid of power supply), particularly simple, robust, reliable and inexpensive, is associated to a pump and designed so as to act as an automatic switching, controlled by the drag exerted by the fluid on the shutter of said valve, such that said valve is capable of directing the fluid in the branch and in the appropriate direction, as a function, on the one hand, of the nature of the fluid (typically: air or urea solution) and, on the other hand, of the head (that is to say of the mechanical energy, here depending on the pressure and the flow rate) which is imparted to said fluid.

More particularly, since the shutter is designed (calibrated), by the dimensions, shape and density thereof, so as to react differently according to the drag that the fluid, which comes at the inlet of the valve, exerts on said shutter, wherein said drag depends in particular on the flow velocity, dynamic pressure and dynamic viscosity of the fluid, then the combination of the double-seat valve and of a pump, whose operating regime may be selected from a plurality of possible operating regimes, that is to say whose intensity of the mechanical power (pressure, flow rate) which said pump imparts to the fluid may be adjusted, allows advantageously carrying out selectively several functions, namely:

- a first function of air purge (purge of the second fluid), which consists in expelling the air out of the pump and out of the first branch, through the valve and the second branch, in order to facilitate the priming of the pump and then the subsequent pressure rise of the first fluid (urea solution) in the first branch,
- a second pressure rise function which allows reaching, in the first branch (main branch), a sufficient working pressure in order to ensure a proper spraying of the first fluid (the urea solution) through the injector,
- a third recirculation function, which allows in particular avoiding the freezing of the first fluid thanks to the mechanical stirring and/or to the heat transfer produced by the closed circuit recirculation of the first fluid (urea solution) through the pump, the valve, the second branch (bypass branch) and the reservoir, wherein said first fluid (urea solution) may advantageously be used as a heat transfer fluid,
- and, preferably, a fourth drain function during which the operating direction of the pump is reversed, to aspirate the first fluid (urea solution) contained in the main branch and the injector, in order to empty at least partially said main branch and said injector of the first fluid contained therein, so as to ensure a protection of the circuit against frost.

Advantageously, the invention thus allows obtaining a very versatile circuit, although particularly simple and compact, by means of a reversible pump and a double-seat valve which is placed by-passing of the main branch located downstream of said pump and which is controlled by the operating regime of said pump.

Other objects, features and advantages of the invention will better appear upon reading the following description, as well as using the appended drawings, given purely by illustrative and non-limiting way, among which.

The invention concerns a circuit 1 intended to transfer, by means of a pump 2, a first fluid 3, such as an aqueous urea solution, from a reservoir 4 to a destination point 5, such as an injector.

For convenience, the destination point might be assimilated to an injector 5 in what follows.

The first fluid 3 will be preferably a substantially incompressible liquid, and more particularly an aqueous solution containing a reducing agent, such as urea, intended to reduce nitrogen oxides (NOx).

Figure 1:
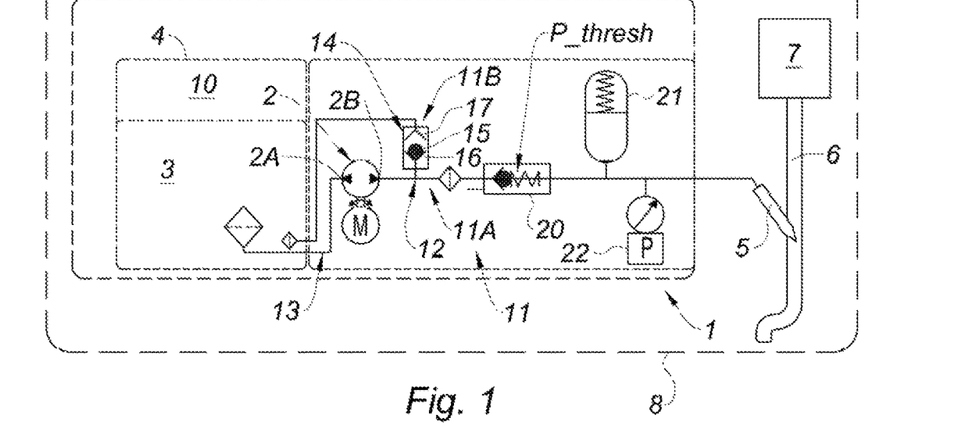
FIG. 1 illustrates a schematic view of a circuit according to the invention.

In this regard, it will be noted that the circuit 1 might preferably constitute, as illustrated in FIG. 1, an exhaust gas depollution circuit intended to inject a first fluid 3 formed by a solution of a reducing agent, such as urea, in an exhaust line 6 of a combustion engine 7.

Of course, the invention is perfectly applicable to other types of circuits 1 for fluid 3 transfer, and more particularly to any circuit 1 of fluid called « automotive » fluid, such as fuel, lubricant (oil), coolant, windshield washer fluid, etc.

Moreover, the invention concerns as such an engine 7 equipped with such a circuit 1, regardless of the nature and the destination of said engine 7, for example an engine 7, preferably a combustion engine, and more specifically a diesel engine, intended to drive a generator set or a motor vehicle 8.

More generally, the invention will thus concern a motor vehicle 8, in particular a land vehicle with drive wheels, equipped with an embedded fluid 3 transfer circuit 1, such as a urea depollution circuit, according to any one of the embodiments of the invention.

The circuit 1 according to the invention is likely to contain, in addition to the first fluid 3, a second fluid 10 whose density is lower than the density of the first fluid 3, and whose, respectively, dynamic viscosity is lower than the dynamic viscosity of said first fluid 3.

Said second fluid 10 is preferably a compressible gas, such as air.

Typically, said second fluid 10 may correspond to a vapor emanating from the first liquid fluid 3, and/or to air which is introduced into the circuit 1, to an air/vapor mixture of first fluid 3, or to a first fluid mist (that is to say to air containing drops of first fluid 3 in suspension).

In particular, the introduction of air into the circuit 1 may occur during an opening of said circuit, for example on the occasion of a filling, or as a normal, progressive and automatic replacement of the first fluid 3 in the reservoir 4, in order to compensate for the volume of first fluid 3 consumed by the circuit 1.

As illustrated in FIG. 1, the circuit 1 comprises, downstream of the pump 2 and the reservoir 4, a downstream circuit portion 11 which includes, on the one hand, a first branch 11A, called main branch, which leads to the destination point (injector) 5 and, on the other hand, a second branch 11B, called bypass branch, which bifurcates from the first branch 11A, at a bifurcation 12 located upstream of the destination point 5, and returns to the reservoir 4.

By convention, the upstream of the circuit will correspond to the reservoir 4, and the downstream to the destination point 5, the upstream-downstream direction then corresponds to the normal and functional transfer direction of the first fluid (urea solution) 3, that is to say to a flow direction in which the fluid(s) 3, 10 move(s), under the driving effect of the pump 2, from the reservoir 4 to the destination point 5.

Although it is not excluded that the pump 2 is integrated into the reservoir 4, and comprises, for example, a piston capable of modifying, and more particularly reducing, the volume of said reservoir 4 in order to propel the first fluid 3 out of the reservoir, into the downstream circuit portion 11, the pump 2 will be preferably distinct from the reservoir 4, and located between said reservoir 4 and the bifurcation 12, that is to say downstream of the reservoir 4 and upstream of both the bifurcation 12 and the destination point (injector) 5.

In this regard, the inlet (intake) 2A of the pump 2 might be connected to the reservoir 4 by an upstream circuit portion 13, while the outlet (discharge) 2B of the pump will be connected to the downstream circuit portion 11, upstream of the bifurcation 12 and, a fortiori, upstream of the injector 5.

Preferably, the pump 2 will be a reversible pump, capable of selectively adopting two operating directions: a first forward direction (as is the case in FIGS. 5, 6, 7, 9, 12, 13, 14 and 15), according to which the pump 2 draws the first fluid 3 from the reservoir 4 for discharging said first fluid 3, possibly with the second fluid 10, into the downstream circuit portion 11, and a second reverse direction, opposite to the preceding one (as is the case in FIGS. 10 and 16), in which the pump 2 aspires the first fluid 3 contained in the downstream circuit portion 11, and more particularly in the main branch 11A, in order to return said first fluid 3 to the reservoir 4 (which allows, in particular, performing an at least partial drain in order to put the circuit 1 in frost-free conditions, as described below).

The circuit 1 according to the invention thus allows using one and the same single reversible pump 2 in order to ensure the different functions assigned to circuit 1 (purging the second fluid, injection of the first pressurized fluid, recirculating the first fluid 3 in a closed circuit, and/or draining the first fluid in case of risk of frost). The circuit 1 may therefore be particularly compact, light and inexpensive to manufacture.

The pump 2 will be preferably driven by an electric motor M.

It will be also noted that the main branch 11A preferably constitutes an open branch, in that it allows the fluid 3 to leave the circuit 1, to be consumed in another circuit (typically here an exhaust line 6), while the bypass branch 11B constitutes a closed branch, which enables the fluid passing through it to return, without loss, to the reservoir 4.

According to the invention, the bypass branch 11B is provided with a double-seat valve 14.

Preferably, said valve 14 forms the starting point of the bypass branch 11B, and, in this regard, is engaged on the main branch 11A immediately at the bifurcation 12.

Preferably, in order to collect more easily the second fluid (air) 10, which is less dense than the first fluid 3 (aqueous solution), the bifurcation 12 is arranged such that the bypass branch 11B is engaged, at said bifurcation 12, on the top of the conduit forming the main branch 11A, so that the double-seat valve 14 locally forms a highest point relative to the main branch 11A. Thus, the double-seat valve 14 is located at an altitude equal to or greater than the altitude of the bifurcation 12.

More generally, if the integration requirements of the circuit 1 in the engine 7 and/or in the vehicle 8 allow it, the bifurcation 12, and consequently the valve 14, might ideally find itself at the highest point (that is to say at the highest altitude point) of the main branch 11A, which will allow automatically and more easily collecting the second fluid (air) 10, that is less dense than the first fluid 3.

As shown in the figures, the double-seat valve 14 comprises a shutter 15 which is movably mounted between a first seat 16 connected to the main branch 11A and a second seat 17 connected to the reservoir 4 (via the bypass branch 11B).

In this case, the first seat 16 forms a lower seat, while the second seat, distinct and distant from the first seat 16, forms an upper seat located at a higher altitude than that of the first seat 16.

Figures 4, 5, 6:
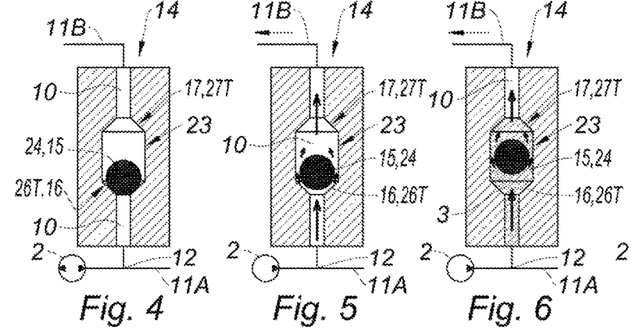
FIGS. 4 to 10 illustrate, according to schematic views in longitudinal section, the operating principle of a double-seat ball valve according to the invention, in the different possible configurations.
Figure 7:
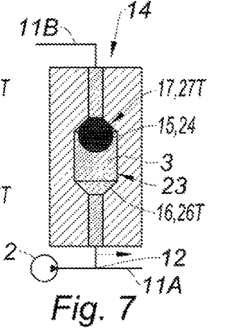
Figure 9:
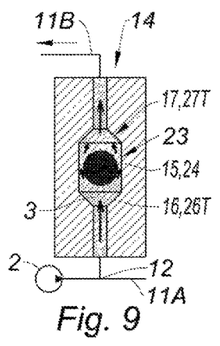
Figure 12:
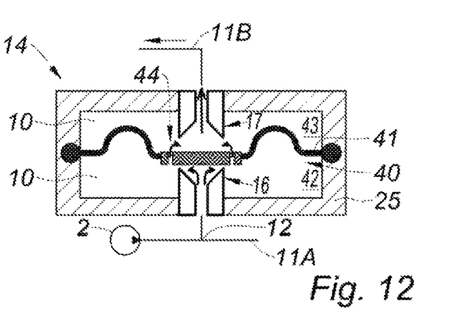
Figure 14:
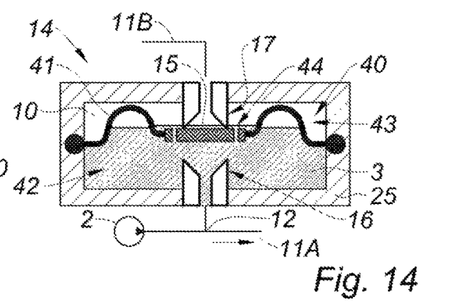
Figure 15:
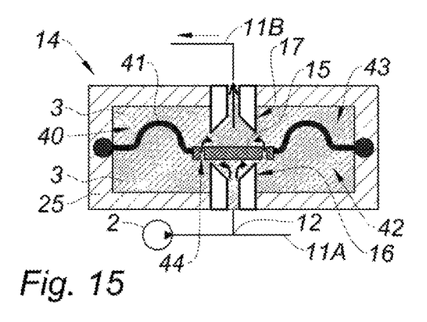

According to the invention, the double-seat valve 14 is arranged to adjust the position of the shutter 15 as a function of the drag exerted by the fluid 3, 10 which penetrates into said valve 14 (by the first seat 16), so to be able to selectively and automatically adopt:

a first configuration, called «purge configuration», corresponding here to FIGS. 5 and 12, in which the shutter 15 adopts, under the action of the second fluid, an intermediate position between the first seat 16 and the second seat 17, thus placing the valve 14 in an open configuration, so as to allow a purge of said second fluid 10 (that is to say more particularly a purge of the air) out of the main branch 11A and a return of said second fluid 10 to the reservoir 4 by the bypass branch 11B, a second configuration, called «pressurized supply configuration», corresponding here to FIGS. 7 and 14, in which the shutter 15 is positioned into sealing contact with the second seat 17, under the action of the first fluid 3, when said first fluid 3 is driven by the pump 2 according to an operating regime called «pressurized supply regime», so as to direct the first fluid 3 towards the destination point 5, through the main branch 11A, under a pressure equal to or higher than a predetermined pressure threshold called «working pressure threshold» P_thresh, and a third configuration, called «recirculation configuration», corresponding here to FIGS. 9 and 15, in which the shutter 15 adopts, under the action of the first fluid 3, an intermediate position between the first seat 16 and the second seat 17, thus placing the valve 14 in an open configuration, when said first fluid 3 is driven by the pump 2 according to an operating regime called «recirculation regime», that is distinct from the pressurized supply regime and that gives said first fluid 3 a head (that is to say a mechanical power, here characterized by the dynamic pressure and the flow rate) that is lower than the head provided by said pressurized supply regime, so as to allow an at least partial recirculation through the bypass branch 11B, and to the reservoir 4, of said first fluid 3 coming from said reservoir 4.

It should be noted that, within the meaning of the invention, the third (recirculation) configuration corresponds to a permanent regime, that is to say it may advantageously be durably maintained, as long as desired, as long as the pump 2 is (continuously) actuated according to the recirculation regime.

Said recirculation regime is indeed selected such that, with regard to the shape, the dimension, and the density of the shutter 15, it allows keeping, in a permanent regime, and not only transiently, said shutter 1 in an intermediate position between the two seats 16, 17, since the drag generated by the circulation of the first fluid 3 about said shutter 15 is indeed sufficiently high to raise said shutter 15 from the first seat 16 but also sufficiently moderate to prevent said shutter 15 from pressing against the second seat 17, so that the first fluid 3 can keep said shutter 15 in "levitation", and consequently freely circulate through the valve 14 as long as desired.

In this regard, the density of the shutter 15 will be preferably strictly greater than the density of the first fluid 3 (urea solution), such that the simple buoyancy (Archimedes force) is not sufficient to raise the shutter 1 in sealing contact with the second seat 17 when the valve 14 is filled with the first fluid 3.

Furthermore, the shutter 15 might, if necessary, be advantageously returned against the first seat 16 under the sole effect of its own weight, that is to say by the sole force of gravity, without it being necessary to provide for an additional elastic return member of the spring kind.

In all cases, the shutter 15 may comprise a ballasting core, for example a metal core, possibly coated with a low density coating layer, for example made of a polymeric material.

It will also be noted that, in the recirculation configuration, the first fluid 3 coming from the reservoir 4 (via the upstream circuit portion 13) and driven by the pump 2 is preferably predominantly (that is to say more than 50% by volume), or even preferably substantially exclusively (typically more than 90%, or even 100%) directed through the bypass branch 11B in order to return to the reservoir 14.

In addition to the double-seat valve 14, and in order to efficiently manage the transition between the recirculation regime, on the one hand, and the purge and pressurized supply regimes, on the other hand, it is advantageously possible to provide on the main branch 11, downstream of the bifurcation 12, and as illustrated in FIG. 1, a non-return valve 20 whose opening threshold (calibration pressure, or calibration head) will correspond to the working pressure threshold P_thresh, itself greater than the dynamic pressure level (head level) necessary and sufficient to press the shutter 15 against the second seat 17.

It will be then possible to choose the recirculation regime (in the forward direction) such that the maximum head that said recirculation regime may give the first fluid 3 at the bifurcation 12 remains strictly lower than the opening threshold of the non-return valve 20, while the pressurized supply regime (also in the forward direction) will be selected more intensive than the recirculation regime, in order to be able to give the first fluid a head which will first of all exceed the level of head necessary to close the double-seat valve 14 by bringing the shutter 15 into sealing contact with the second seat 17, and then which will exceed the opening threshold of the non-return valve 20, in order to allow the transfer (entirely) of the first fluid 3 through the main branch 11A, towards the destination point 5, under a high pressure (working pressure), typically in the order of 5 bar to 10 bars, adapted to the spraying of the first fluid 3 in the exhaust line 6 by the injector 5.

Preferably, the portion of the main branch 11A located downstream of the non-return valve 20, and on which (at the downstream end of which) the injector 5 is located, comprises an accumulator 21 in which the pump 2 allows temporarily storing a reserve of first pressurized fluid 3. This reserve, available at any time, will be used gradually, during the successive openings of the injector 5.

Advantageously, the use of an accumulator 21 allows energizing the pump 2, in the pressurized supply regime, only intermittently, when it is necessary to recharge the accumulator 21.

Figure 8:
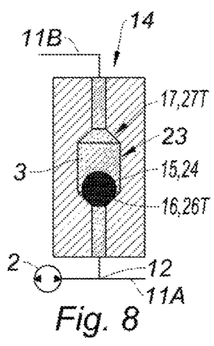

Apart from these recharging phases, it is possible to opt for a less demanding operating regime (recirculation regime), the double-seat valve 14 and the non-return valve 20 then cooperating to direct the first fluid 3 into the bypass branch 11B such as illustrated in FIGS. 9 and 15, or even totally deactivate the pump 2 and let the pressure fall again down to the non-return valve 20 (upstream of said non-return valve 20), and thus in particular in the bifurcation 12, as illustrated in FIG. 8.

It will be thus possible to improve the lifetime of the pump 2 and of the circuit 1 and reduce their energy consumption.

In order to monitor the process, and more particularly to measure the pressure in the main branch 11A, downstream of the bifurcation 12 and of the non-return valve 20, and upstream of the injector 5, it is also possible to provide a pressure sensor 22, such as illustrated in FIG. 1.

Figure 10:
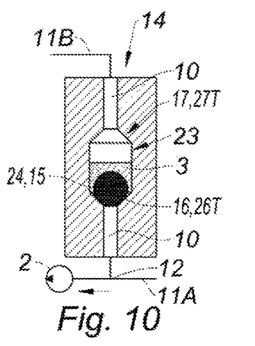
Figure 16:
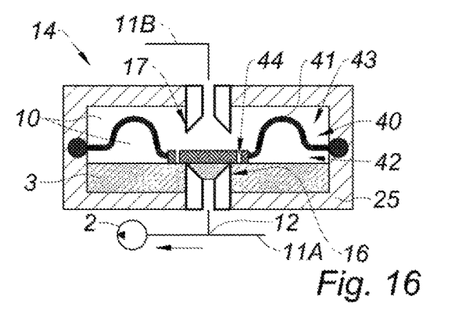

Preferentially, the double-seat valve 14 may also adopt, in addition to the three aforementioned configurations, a fourth configuration, called « vacuum configuration », in which the shutter 15 comes into sealing contact with the first seat 16, when the pump 2 adopts a regime called « vacuum regime », according to which said pump 2 returns the first fluid 3 contained in the main branch 11A to the reservoir 4, so as to place the double-seat valve 14 in a closed configuration, such as illustrated in FIGS. 10 and 16, in order to prevent the aspiration of the first fluid 3 and/or second fluid 10 through the bypass branch 11B.

By impeding the return to the pump 2 of the first fluid 3 (urea solution) and especially of the second fluid 10 (air), present in the bypass branch 11B (or coming from the reservoir 4 via said bypass branch 11B), the double-seat valve 14 in the vacuum configuration allows the pump 2, when it is actuated in the reverse direction, to depressurize the outlet 2B thereof and consequently to depressurize the main branch 11A, and thus to effectively aspire at least one part of the first fluid 3 contained in said main branch 11A, and to return said first fluid 3 to the reservoir 4 through the upstream circuit portion 13.

Such a vacuum configuration advantageously allows draining the main branch 11A of its first fluid 3 when the vehicle is stopped in cold weather, in order to prevent a frost of the first fluid 3 from damaging the circuit 1.

It will be noted that, preferably, the non-return valve 20 is controlled, as that it is possible to force its opening on command, for example by an electrical signal, even though the pump 2 is stopped or actuated in the reverse direction and the pressure upstream of said non-return valve 20 is, consequently, lower than the opening threshold of said valve (working pressure threshold P_thresh).

Then, by forcing the opening of the non-return valve 20, the efficiency of the anti-freeze drain is guaranteed, since the accumulator 21, and more generally all the entire of the main branch 11A located downstream of said non-return valve 20 and initially placed under working pressure, are allowed to be discharged upstream, through the pump 2 and to the reservoir 4.

According to a preferred variant, which corresponds to FIGS. 2 to 10, the double-seat valve 14 is formed by a ball valve, which comprises a channel 23 which connects the first seat 16, placed in a lower position, to the second seat 17, placed in an upper position (that is to say at a higher altitude than that of the first seat 16), as well as a shutter 15 formed by a ball 24, whose diameter is smaller than the passage section (transverse section) of the channel 23, whose density is greater than the density of the first fluid 3, and which is placed in the channel 23 so as to be able to be freely moved within said channel 23 from the first seat 16 to the second seat 17 and conversely.

The density of the ball 24 greater than the density of the first fluid 3 prevents said ball 24 from obstructing the second seat 17 solely due to the buoyancy, when the channel 23 is filled with the first fluid 3, which makes the existence of a recirculation regime possible.

As indicated above, the ball 24 might for this purpose be ballasted by a dense, preferably metal, core Thus, the ball 24 might for example be exclusively formed of a stainless metal material, such as a stainless steel, for example austenitic stainless steel.

Alternatively, the ball 24 might comprise a dense core, preferably a metal core, for example a steel core, coated with a layer of polymeric material.

The polymeric coating material might be rigid and may be formed, for example, of polyamide, polypropylene or polyethylene, and even flexible, and formed of an elastomeric material (rubber), of the EPDM, HNBR, NBR (nitrile butadiene rubber) type, etc.

An advantage of an elastomeric coating is to improve the sealing of the ball in contact with the seats 16, 17, in particular if said seats are formed of a rigid material, almost non-deformable under the single pressure of the ball 24.

Preferably, the ball will be totally free to be displaced between the seats 16, 17, under the single combined action of the gravity, on the one hand, which tends to return the ball 24 against the first seat 16, and of the drag of the fluid 3, 10, on the other hand, which tends to push the ball 24 towards the second seat 17, the valve 14 thus being devoid of a return spring which would pre-stress said ball 24 to a determined position (and in particular against the first seat 16). The valve 14 has thus a particularly simple structure, with a very reliable operation.

Preferably, for the sake of manufacturing convenience and as well as for optimizing the efficiency of the return of the ball 24 towards the first seat 16 by the gravity and the balancing of the ball in the recirculation configuration, the channel 23 extends substantially, or even exactly, vertically, and particularly preferably along a rectilinear central axis (here a vertical rectilinear central axis).

Also, for ease of manufacture and for operation efficiency, the seats 16, 17 and the passage section of the channel 23 will have preferably a revolution shape with a circular base.

Preferably, as it is clearly shown in FIGS. 2 to 10, the first seat 16 and/or the second seat 17 has a frustoconical shape, which flares out (that is to say which opens by widening) on the channel 23, so as to facilitate the centering and the sealing contact (into the first fluid 3, and into the second fluid 10), according to an annular contact, of the ball 24 against the concerned seat 16, 17.

Figure 2:
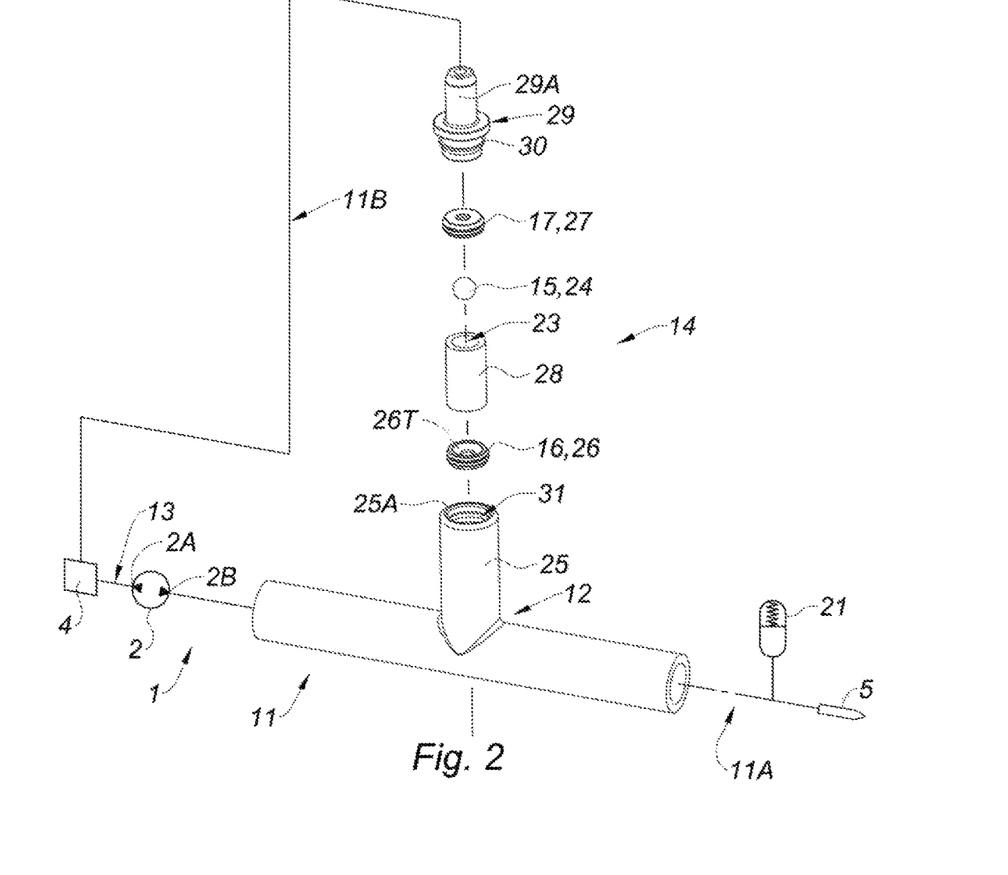
FIG. 2 illustrates, according to an exploded perspective view, a bifurcation embodiment according to the invention, provided with a double-seat ball valve.
Figure 3:
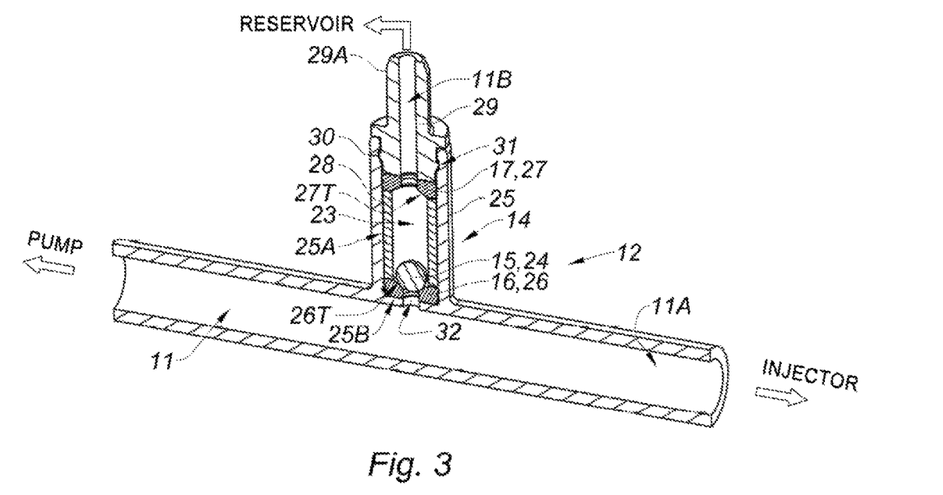
FIG. 3 illustrates, according to a perspective view with a material cutaway, the bifurcation and the valve of FIG. 2.

According to a preferred variant illustrated in FIGS. 2 and 3, the double-seat valve 14 comprises a valve body 25 forming a cylindrical jacket 25A, in which are successively stacked a first washer 26 forming the first seat 16, a tubular spacer 28 which bears on the first washer 26 and which laterally delimits the channel 23, a second washer 27 forming the second seat 17 and which bears against the spacer 28, and a tubular end-piece 29 which is fastened on the valve body 25 which bears against the second washer 27.

Advantageously, such a modular structure, obtained by substantially coaxially stacking, in the jacket 25A delimited by the valve body 25, the elements constituting the valve 14 (washers 26, 27, spacer 28 and end-piece 29), which preferably have a shape of revolution, facilitates the assembling of the valve 14 and the production thereof at a lower cost.

In particular, it will be noted that, advantageously, the first washer 26 and the second washer 27 will preferably have an annular revolution structure, having a central passageway therethrough allowing the flow of the fluid, said central passage preferably having a frustoconical portion 26T, 27T, of the countersink type, which widens on the channel 23, in order to receive the ball 24.

Said first and second washers 26, 27 may be formed by identical parts, thus allowing standardizing their production.

According to a possible variant, each washer 26, 27 might have a single flared frustoconical shape (countersink) 26T, 27T forming a seat 16, 17 only on one of its faces, the other face being preferably plane. It will be then possible to use identical washers 26, 27 simply by ensuring orienting them differently within the stack, the single seat 16 of the one 26 facing the single seat 17 of the other 27, as illustrated in FIGS. 2 and 3.

According to another variant, each washer may have, on each of its both (lower and upper) faces normal to the axis of the stack, a flared frustoconical shape (countersink) 26T, 27T capable of forming a seat 16, 17, that is to say the washer 26, 27 will have a central bi-conic passage (substantially in the shape of a hourglass) offering a double seat, so that said washer 26, 27 might be used indifferently in either direction, which will avoid any risk of reversal during the assembling.

The valve body 25 may advantageously be integrated in one single piece with the element materializing the bifurcation 12.

Thus, if the element materializing the bifurcation 12 is in the shape of a «T» connector, the main branch 11A might form the substantially horizontal, herein lower, branch of said «T» connector, while the valve body 25 will form the vertical, herein upper, branch of said «T» connector, secant to the main branch 11A.

Furthermore, according to a possible variant of a particularly compact and solid arrangement, the valve body 25, and more generally, the element materializing the bifurcation 12, might be fastened or even integrated with the casing of the pump 2, directly with the outlet 2B of said pump.

Thus, the purge phase of the second fluid (air), in particular during the priming of the pump 2, will be accelerated and facilitated.

The tubular end-piece 29 might include a nipple 29A, that is to say a male end allowing to connect the valve 14, by the second seat 17, to a duct, possibly to a flexible pipe, that forms the rest of the bypass branch 11B leading to the reservoir 4.

Advantageously, the tubular end-piece 29 will be fastened to the body of the valve 25 so as to sandwich and axially compress (in this case substantially vertically) the washers 26, 27 against the edges of the spacer 28, and against the bottom 25B of the valve body, which bottom 25B forms a shoulder which surrounds here an inlet orifice 32 which puts the valve 14 into communication with the main branch 11A by the first seat 16.

The fastening of the tubular end-piece 29 on the valve body 25 might be obtained, for example, by screwing or, as illustrated in FIGS. 2 and 3 by fitting, and more particularly by snap-fitting by means of a retaining (here annular) bead 30 which cooperates with a corresponding recess (here a groove 31) dug into the internal lateral wall of the jacket 25A delimited by the valve body 25.

Advantageously, the axial compression produced by the end-piece 29 allows guaranteeing, in a reproducible manner, that the stack constituting the valve 14 is perfectly held and stable.

In order to facilitate this axial compression while avoiding the deterioration of the parts, but also in order to improve the sealing of the contact between the shutter 15 and the seats 16, 17, said seats 16, 17, and more particularly the washers 26, 27, might advantageously be filled or coated with an elastomeric material (especially if the shutter 15 itself is not coated with an elastomeric layer).

According to a particularly preferred variant, the first washer 26 which forms the first seat 16, and/or respectively the second washer 27 which forms the second seat 17, is formed in one piece of an elastomer.

Advantageously, when the seat 16, 17 is coated with an elastomeric layer, or even constituted of an elastomeric material, it is not necessary to provide an additional sealing element, such as a seal, which simplifies the manufacture of the valve 14.

Otherwise, it might be possible, however to consider filling the seat 16, 17 with a distinct seal, such as an O-ring, or to use a shutter 15 itself covered with an elastomeric layer, as mentioned above.

According to a possible variant, which corresponds to FIGS. 11 to 16, the double-seat valve 14 comprises a valve body 25 delimiting a chamber 40, and the shutter 15 is carried by an elastic membrane 41 which divides the chamber 40 into a first cavity 42 into which the first seat 16 opens and a second cavity 43 into which the second seat 17 opens.

Figure 11:
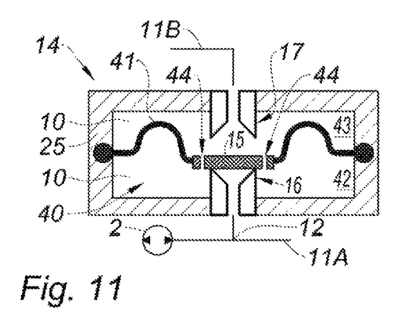
FIGS. 11 to 16 illustrate, according to schematic views in longitudinal section, the operating principle, in the various possible configurations, of another variant of a double-seat valve, within which the shutter is suspended by an elastic membrane.

The shutter 15 is then traversed by at least one passage orifice (44), which is arranged such that the first fluid 3 and/or the second fluid 10 may circulate from the first seat 16, located in the first cavity 42, up to the second seat 17, located in the second cavity 43, or conversely, via said passage orifice 44, only when the shutter 15 is in the intermediate position, at a distance from each of the two seats 16, 17 (FIGS. 12, 13 and 15), but not when the shutter 15 is sealingly bearing against either of said seats 16, 17 (FIGS. 11, 14 and 16).

For this purpose, the passage orifice(s) 44 will be preferably arranged so as to put the first cavity 42 into communication, preferably into direct and permanent communication, with the second cavity 43, while said shutter 15 will have at least one solid portion which, when said shutter 15 is into sealing contact with a seat 16, 17, separates said seat 16, 17 from the corresponding cavity 42, 43, so as to prevent the fluid 3, 10 present into said cavity 42, 43 from gaining and passing through said seat 16, 17.

According to a preferential possibility of arrangement, corresponding to FIGS. 11 to 16, the shutter 15 may be advantageously formed by a rigid flat disc arranged to alternately cover the first seat 16 and the second seat 17 which protrude respectively into the first cavity 42 and into the second cavity 43.

The diameter of the shutter 15 is then preferably greater than the diameter of said seats, while one, and preferably several, passage orifices 44 are pierced through the thickness of said shutter 15, at the periphery thereof, in a portion of the shutter located radially beyond the walls of the seats 16, 17, that is to say beyond the solid portion of the shutter 15 which serves to close the concerned seat 16, 17 when the shutter is into sealing contact with said seat 16, 17.

Thereby, when the shutter bears on a seat 16, 17, the first and second cavities 42, 43 communicate with each other via the passage orifices 44, but not with the concerned seat 16, 17, which is covered and closed by the solid portion of the shutter 15, and thus separated, by the shutter 15, from the corresponding cavity 42, 43. The valve 14 is then in the closed position.

Conversely, when the shutter 15 is detached from the two seats 16, 17, the fluid 3, 10 may freely circulate from one seat 16 to the other seat 17, via successively the first cavity 42, the passage orifice 44 and then the second cavity 43. The valve 14 is then in the open position.

It will be noted that the passage orifices 44 preferably form the only communication channels between the two cavities 42, 43.

The elastic membrane 41 is advantageously made of an elastomer, and forms a deformable partition between the first and second cavities 42, 43, a partition which is advantageously sealed to the first fluid 3 and to the second fluid 10, outside the passage orifices 44.

Said membrane 41 also serves as a guide and a suspension spring for the displacement of the shutter 15 and the proper positioning of said shutter 15 on the seats 16, 17.

In this regard, the membrane 41 will be preferably arranged so as to exert at rest, on the shutter 15 it carries, a slight pre-stress which tends to automatically return said shutter 15 against the first (lower) seat 16, while being sufficiently moderate to allow the first fluid 3 as well as the second fluid 10 to lift the shutter 15 in order to detach said shutter from the first seat 16 in the purge configuration (FIGS. 12 and 13) or recirculation (FIG. 15) configuration, and to press said shutter 15 against the second (upper) seat 17 in the pressurized supply configuration (FIG. 14).

Of course, the passage orifices 44 will be dimensioned, in particular with regard to the dimensions and the density of the shutter 15, as well as the mechanical features of the membrane 41, so as to generate the appearance of an adequate drag force adapted to the considered operating configuration, when the fluid 3, 10 which emerges from the first seat 16 strikes the shutter 15 and tends to flow through said passage orifices 44, thus pushing said shutter towards the second seat 17.

The operation of the circuit 1 will now be described in more detail.

In this regard, it is remarkable that the invention also concerns as such a method during which all or part of the operations are implemented, and therefore operating configurations, of the valve 14 and of the circuit 1 according to the invention, as well as the use, for the aforementioned purposes, of a double-seat valve 14 within a circuit 1.

Initially, the pump 2 is inactive (and not primed), following a prolonged stop of the vehicle 8.

The pump 2 and/or the main branch 11A, as well as optionally, the upstream circuit portion 13, then contain second fluid (air) 10.

The double-seat valve 14 is in the closed rest position, the shutter 15 resting on the first seat 16 (FIGS. 4 and 11).

In order to prime the pump 2, said pump 2 is then actuated in the forward direction, according to a first operating regime called «purge regime», so as to compress and expel the second fluid (air) out of the upstream portion of the circuit 13, and out of the pump 2, and thus to push said second fluid 10 (air) back to the bifurcation 12.

It will be noted that the second fluid 10 (air), due to the low density thereof (lower than the density of the first fluid 3), naturally tends to reach the highest points of the circuit 1 and to accumulate therein. The fact of placing the double-seat valve 14 above the main branch 11A, that is to say at a locally highest point of the bifurcation 12, or even the fact of placing the bifurcation 12 more generally (and thus the valve 14) at a highest point of the downstream circuit portion 11, thus facilitates the collection of said second fluid 10 (air) by the bypass branch 11B.

The second fluid (air) 10, even weakly compressed, is present at the first seat 16 and raises the shutter 15, thus detaching said shutter 15 from said first seat 16 sufficiently to enable the first fluid (air) 10 to escape through the double-seat valve 14, and to reach the bypass branch 11B in order to join the reservoir 4 (FIGS. 5 and 12).

As soon as the upstream portion of the circuit 13 is purged from the second fluid (air) 10, and thus filled with the first fluid (urea solution) from the reservoir 4, the first fluid fills the pump 2 which is thus primed.

The purge regime proceeds so as to gradually bring the first fluid 3 (urea solution) to the bifurcation 12 and to the double-seat valve 14, which completes expelling the second fluid 10 (air) through said valve 14, under the thrust of the first fluid 3 (urea solution).

Figure 13:
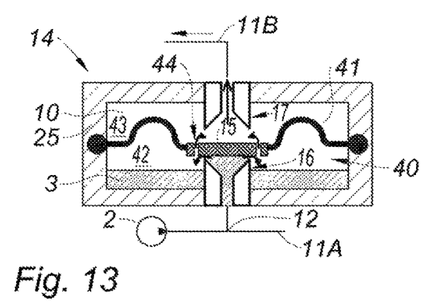

When the first fluid 3 (urea solution) reaches the double-seat valve 14, it progressively fills said valve, gradually replacing the second fluid 10 (air) which escapes through the second seat 17 still open (FIGS. 6 and 13).

The pressurized supply regime is then engaged.

This regime allows the pump 2 to give the first fluid 3, always in the forward direction, a head (pressure and/or flow rate) at least equal to, and preferably greater than, the head imparted by the purge mode.

In order to pass from the purge regime to the pressurized supply regime, it is possible, for example, to at least maintain and preferably increase the intensity of the electric current which supplies the electric engine M of the pump 2.

The engagement of the pressurized supply regime, and more particularly the passage from the purge regime to the pressurized supply regime, imparts sufficient head (mechanical power, that is to say pressure and/or flow rate) to the first fluid 3 (urea solution) for dynamically driving the shutter 15 to the second seat (FIG. 6) until said shutter 15 is brought against and pressed into sealing contact of the second seat 17, thus closing the access to the bypass branch 11B (FIGS. 7 and 14).

The head imparted to the first fluid 3 (urea solution) by the pressure supply regime is sufficient not only to maintain the shutter 15 pressed against the second seat 17 in order to direct (entirely) the first fluid 3 to the main branch 11A, the accumulator 21 and the injector 5, but also to bring said first fluid 3 contained in the main branch 11A at a pressure greater than the opening threshold P_thresh of the non-return valve 20.

The pressurized supply regime continues (is maintained) until a sufficient filling of the accumulator 21 is reached.

The pump 2 may then be stopped.

The pressure upstream of the bifurcation 12 falls back, thus passing below the opening threshold P_thresh and thus causing the closure of the check valve 20, as well as the coming of the shutter 15 down to the first seat 16 under the effect of the weight thereof (FIG. 8).

The portion of the main branch 11B located downstream of the check valve 20 remains advantageously under working pressure thanks to the accumulator 21 which delivers the first fluid 3 (urea solution) to the downstream of the injector 5, as needed.

The pump 2 advantageously remains primed, and is available for a new recharging cycle of the accumulator 21.

Thus, when the amount of the first fluid 3 stored in the accumulator 21 falls below a predetermined alert threshold, the pump 2 is reactivated according to the pressurized supply regime, which has the effect of almost immediately moving upward the shutter 15 against the second seat 17 (FIGS. 6 and 7 and FIG. 14), bring the pressure of the first fluid 3 beyond the opening threshold P_thresh of the check valve again and thus recharging the accumulator 21.

As indicated above, the presence of an accumulator 21 allows operating the pump 2 only intermittently, each cycle of pressurized supply regime being initiated only when a recharge of the accumulator 21 is necessary, and being followed by a rest cycle (stop of the pump 2), which allows saving energy and reducing the wear of the pump 2.

In addition to the pressurized supply phases, the circuit 1 according to the invention may advantageously be used in recirculation mode, for example in order to avoid the frost of the first fluid 3 in the reservoir 4, the pump 2, the upstream circuit portion 13, the double-seat valve 14 or the bypass branch 11B.

Such a mode of recirculation with an anti-freeze aim might for example consist in circulating in a closed loop a first fluid volume 3 which has been heated beforehand, for example at the pump 2 or the upstream portion 13 of the circuit, by any means (such as a heating resistor).

In order to implement the recirculation mode, the pump 2 is activated in the forward direction according to a (permanent) bypass regime which imparts to the first fluid 3 coming from the reservoir 4 and passing through the pump 2 a head which is strictly below the opening threshold P_thresh of the check valve 20 but which is nevertheless just necessary and sufficient to create a drag which raises the shutter 15 from the first seat 16 without, however, pressing said shutter 15 against the second seat 17, so as to maintain said shutter 15 in levitation in an intermediate position, at a distance from the two seats 16, 17 (FIGS. 9 and 15), and thus to ensure a continuous circulation of the first fluid 3 about said shutter 15, through the valve 14 then through the bypass branch 11B and to the reservoir 4 where said first fluid 3 thus returns in a closed loop.

Such recirculation phases might, for example, last at least 2 s (two seconds), or even more, for example at least 5 s, at least 10 s, at least 30 s, or even typically between 60 s and 300 s (in particular the case of a recirculation of the first fluid 3 previously heated).

When stopping (parking) the vehicle 8, and in particular when there is a risk of freezing of the the first fluid 3, it is possible to at least partially drain the circuit 1, and in particular the main branch 11A.

It will be noted that the reservoir 4 does not require to be drained, since said reservoir is partially protected due to the existence of a compressible volume of second fluid 10 which allows accommodating the expansion of the first fluid 3 in said reservoir 4.

In order to proceed with the drain, at least partial, of the main branch 11A, the pump 2 may first be stopped and the opening of the check valve 20 forced, for example, thanks to an electrical control setpoint, so as to allow the accumulator 21 to be discharged upstream, through the pump 2 and up to the reservoir 4.

In order to assist the draining of the accumulator 21 and of the main branch 11A, afterwards or even simultaneously with the forced opening of the check valve 20, the pump 2 may be initiated in the reverse direction, according to the «vacuum regime», in order to create at the outlet 2B of the pump a (slight) vacuum allowing aspiring the first fluid 3 contained in the downstream circuit portion 11 and returning said first fluid 3 to the reservoir 4, via the upstream circuit portion 13.

Thereby, under the effect of the vacuum, the shutter 15 advantageously automatically presses on the first seat 16 (FIGS. 10 and 16), so as to prevent the second fluid 10 (air) and if necessary the first fluid 3 (urea solution) present in the bypass branch 11B from returning to the main branch 11A, which allows concentrating the aspiration force on the main branch 11A, and thus preventing the drain of said main branch 11A from being disturbed by the intrusion of fluid 3, 10 coming from the bypass branch 11B.

Upon the next start of the vehicle 8, it is possible to prime the pump 2 again, to purge the second fluid 10 (air) and to recharge the accumulator 21 again as indicated above.

Advantageously, by means of a simple circuit 1 and thanks to a double-seat valve 14 which is automatically controlled, by the head level determined by the operating regime selected for the pump 2, in three functional positions (closed on the first seat 16, closed on the second seat 17, and open in an intermediate position), the invention thus allows carrying out all the operations useful for the proper operation of said circuit 1 (air purge, pressurized injection, recirculation and anti-freeze drain).

Of course, the invention is in no way limited to the sole described variants, the person skilled in the art being in particular able to isolate or freely combine either of the aforementioned features, or to substitute them with the equivalents.

The invention claimed is:

1. A circuit intended to transfer, by means of a pump, a first fluid from a reservoir to a destination point, said circuit comprising:

downstream of the pump and of the reservoir, a downstream circuit portion comprising a first, main branch which leads to the destination point and a second, bypass branch which bifurcates from the first branch at a bifurcation located upstream of the destination point and connects to the reservoir wherein the circuit contains the first fluid and a second fluid whose density and dynamic viscosity are lower than those of the first fluid; and the bypass branch is provided with a double-seat valve, which is devoid of power supply and comprises a shutter which is movably mounted between a first seat connected to the main branch and a second seat connected to the reservoir, the double-seat valve being arranged to adjust the position of the shutter depending on drag exerted by the first and/or second fluid which penetrates into the valve, so as to be configured to selectively and automatically adopt:

(1) a first configuration in which the shutter adopts, under the action of the second fluid, an intermediate position between the first seat and the second seat, thus placing the valve in an open configuration so as to allow a purge of the second fluid out of the main branch and a return of the second fluid to the reservoir by the bypass branch;

(2) a second configuration in which, under the action of the first fluid, the shutter is positioned into sealing contact with the second seat when the first fluid is driven by the pump according to a first operating regime so as to direct the first fluid towards the destination point, through the main branch, under a pressure equal to or higher than a predetermined pressure threshold; and (3) and a third configuration in which the shutter adopts, under the action of the first fluid, an intermediate position between the first seat and the second seat, thus placing the valve in an open configuration when the first fluid is driven by the pump according to a second operating regime that is distinct from the first operating regime and that imparts to the first fluid a head lower than the first operating regime so as to allow an at least partial recirculation through the bypass branch to the reservoir of the first fluid.

2. The circuit according to claim 1, wherein the double-seat valve may also adopt a fourth configuration in which the shutter comes into sealing contact with the first seat when the pump adopts a third operating regime in which the pump returns the first fluid contained in the main branch to the reservoir so as to place the double-seat valve in a closed configuration preventing aspiration of the first fluid and/or second fluid through the bypass branch.

3. The circuit according to claim 1, wherein the double-seat valve comprises (i) a ball valve that comprises a channel which connects the first seat, placed in a lower position, to the second seat, placed in an upper position and (ii) a shutter formed by a ball, whose diameter is smaller than a passage section of the channel, whose density is greater than the density of the first fluid, and which is placed in the channel so as to be able to be freely moved within the channel from the first seat to the second seat and conversely.

4. The circuit according to claim 2, wherein the double-seat valve comprises (i) a ball valve that comprises a channel which connects the first seat, placed in a lower position, to the second seat, placed in an upper position and (ii) a shutter formed by a ball, whose diameter is smaller than a passage section of the channel, whose density is greater than the density of the first fluid, and which is placed in the channel so as to be able to be freely moved within the channel from the first seat to the second seat and conversely.

5. The circuit according to claim 3, wherein the double-seat valve comprises a valve body forming a cylindrical jacket in which are successively stacked a first washer forming the first seat, a tubular spacer which bears on the first washer and which laterally delimits the channel, a second washer forming the second seat and which bears against the spacer, and a tubular end-piece which is fastened on the valve body which bears against the second washer.

6. The circuit according to claim 4, wherein a first washer which forms the first seat and/or a second washer which forms the second seat is formed in one single piece of an elastomer.

7. The circuit according to claim 1, wherein
   the double-seat valve comprises a valve body delimiting a chamber;
   the shutter is carried by an elastic membrane which divides the chamber into a first cavity into which the first seat opens and a second cavity into which the second seat opens; and
   the shutter is traversed by at least one passage orifice, which is arranged such that the first fluid and/or the second fluid circulates from the first seat, located in the first cavity, to the second seat, located in the second cavity, or conversely, via said passage orifice, only when the shutter is in the intermediate position, displaced from each of the two seats, but not when the shutter is sealingly bearing against either of said seats.

8. The circuit according to claim 2, wherein
   the double-seat valve comprises a valve body delimiting a chamber;
   the shutter is carried by an elastic membrane which divides the chamber into a first cavity into which the first seat opens and a second cavity into which the second seat opens; and
   the shutter is traversed by at least one passage orifice, which is arranged such that the first fluid and/or the second fluid circulates from the first seat, located in the first cavity, to the second seat, located in the second cavity, or conversely, via said passage orifice, only when the shutter is in the intermediate position, displaced from each of the two seats, but not when the shutter is sealingly bearing against either of said seats.

9. The circuit according to claim 1, wherein the circuit constitutes an exhaust gas depollution circuit configured to inject a first fluid formed by a solution of a reducing agent.

10. A motor vehicle equipped with a fluid transfer circuit according to claim 1.

11. A motor vehicle equipped with a fluid transfer circuit according to claim 2.

12. A motor vehicle equipped with a fluid transfer circuit according to claim 3.

13. A motor vehicle equipped with a fluid transfer circuit according to claim 4.

14. A motor vehicle equipped with a fluid transfer circuit according to claim 5.

15. A motor vehicle equipped with a fluid transfer circuit according to claim 6.

16. A motor vehicle equipped with a fluid transfer circuit according to claim 7.

* * * * *